United States Patent [19]

Grummer

[11] 4,206,466

[45] Jun. 3, 1980

[54] NON-FOULING PRINT STYLUS

[75] Inventor: William L. Grummer, Newbury Park, Calif.

[73] Assignee: The United States of America as represented by the Secretary of the Navy, Washington, D.C.

[21] Appl. No.: 19,792

[22] Filed: Mar. 12, 1979

[51] Int. Cl.² ............................................. G01D 15/06
[52] U.S. Cl. .................................. 346/139 C; 346/165
[58] Field of Search .................. 346/139 C, 162, 163, 346/164, 165, 155

[56] References Cited

U.S. PATENT DOCUMENTS

| 3,018,153 | 1/1962 | Steen | 346/139 C |
| 3,291,276 | 12/1966 | Milne | 346/165 X |
| 3,713,168 | 1/1973 | Baker | 346/165 |
| 3,961,336 | 6/1976 | Walker | 346/139 C |
| 3,999,189 | 12/1976 | Buro | 346/139 C |

Primary Examiner—Joseph W. Hartary
Attorney, Agent, or Firm—R. S. Sciascia; Charles D. B. Curry; Francis I. Gray

[57] ABSTRACT

A non-fouling print finger having an integral shield. The shield guides residue passed the print stylus to a reduced area of the print finger body from whence the residue falls from the print finger. The shield also prevents excessive bending of the print stylus movable arm in the reverse direction during cleaning.

2 Claims, 2 Drawing Figures

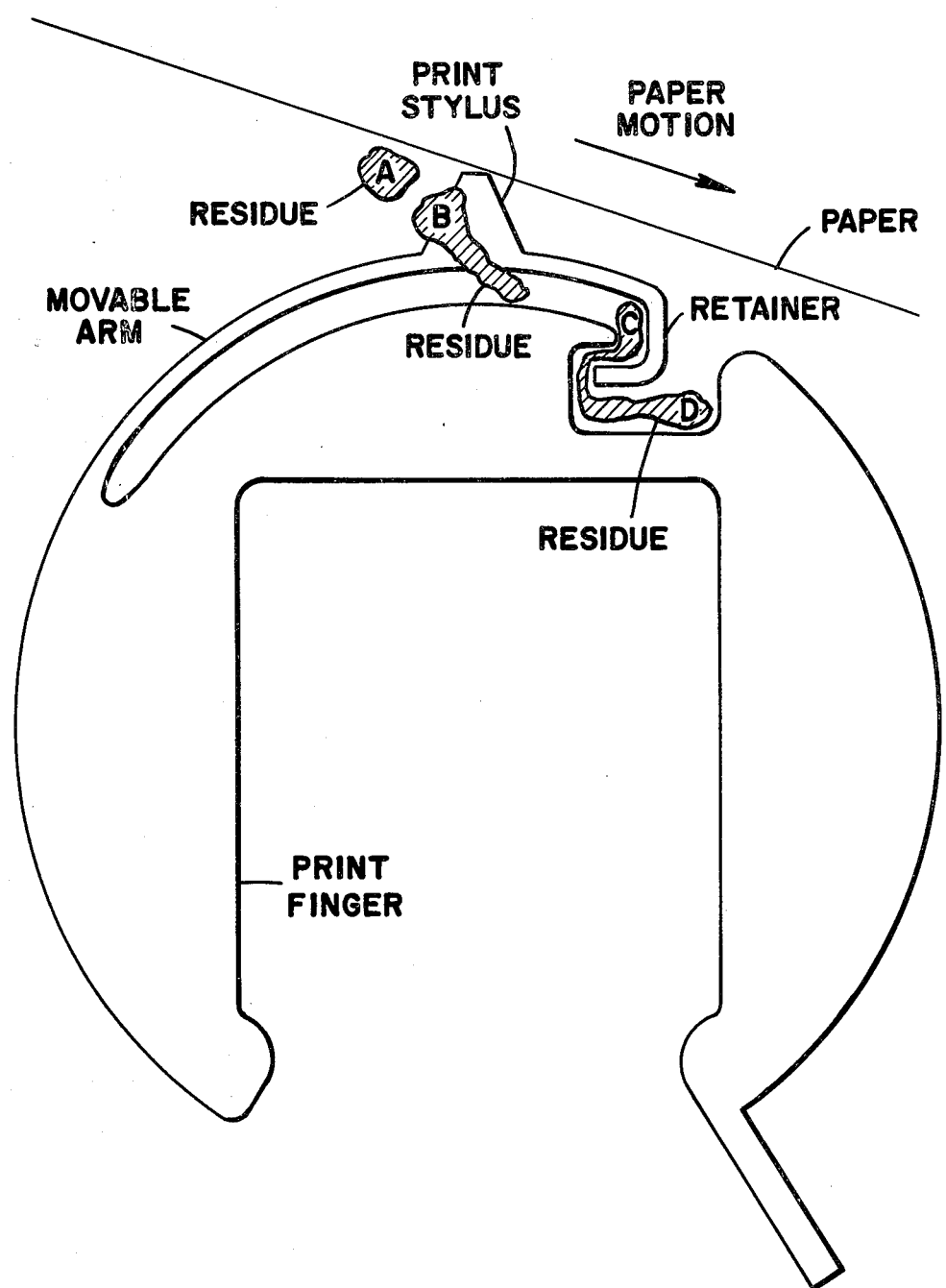
FIG_1
(PRIOR ART)

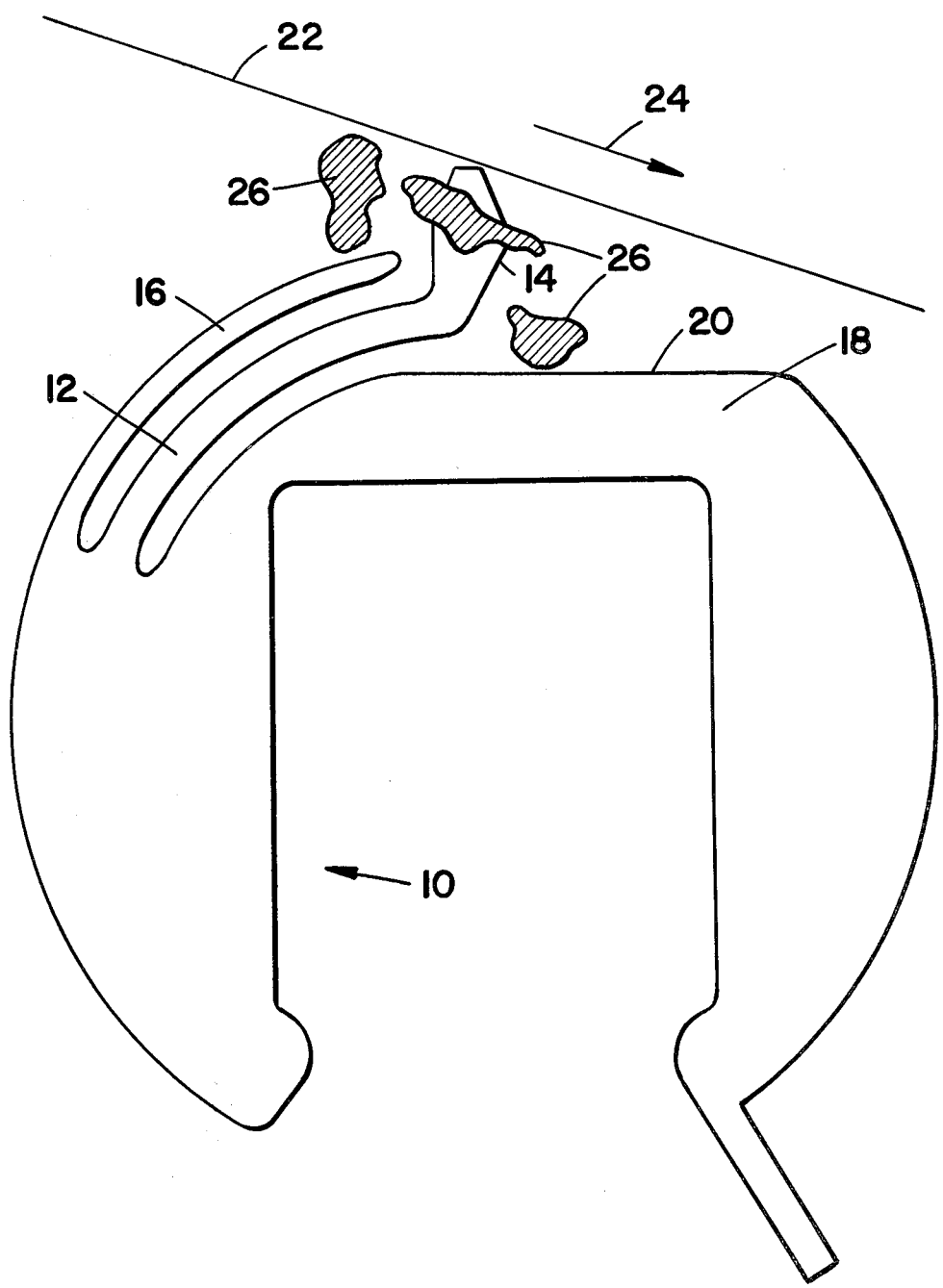
FIG_2

NON-FOULING PRINT STYLUS

BACKGROUND OF THE INVENTION

1. Field of the Invention

The present invention relates to print styli for an electrosensitive printer, and more particularly to print styli which are not subject to fouling from print residue.

2. Description of Prior Art

In an electrosensitive printer which prints on electrosensitive paper, a mark is produced on the paper by passing an electric current from print styli through the paper. A plurality of the print styli are mounted on a nonconductive bar and separated from each other by nonconductive spacers. The spacers perform the functions of electrically isolating the print styli from each other and of providing a clearance between adjacent print styli. Thus, each print stylus can be fired individually to command, producing an individual dot on the paper. Characters are formed by firing the appropriate print styli in a dot row, advancing the paper, and printing the next dot row. This process is repeated until the characters are completely formed.

The print styli are spring loaded against the electrosensitive paper so that adequate contact is maintained between the print styli and the paper even over paper discontinuities such as perforations. A portion of the circumference of a print finger is used as the print stylus. During the print process a residue is formed both above and below the print stylus. The residue is forced between the print stylus and the print finger by the motion of paper and by gravity. This leaves the print stylus open to contamination from the print residue which eventually surrounds the print stylus to immobilize it.

FIG. 1 shows a print finger similar to one used by Baker, U.S. Pat. No. 3,713,168, and Walker et al, U.S. Pat. No. 3,961,336. The print stylus is retained by a mechanism which allows print residue to be forced down into the print finger by the motion of the paper and gravity. Print residue starting from position A would be forced passed the print finger and would fill the void between the movable arm and the body of the print finger (positions B and C). Thr residue would accumulate in the area of the print stylus retainer (positions C and D), fouling the print stylus, i.e., preventing the print stylus from returning to its static position after being depressed. The retainer is necessary to prevent the movable arm from being bent past its yield point when brushed in the direction opposite the paper motion during cleaning.

SUMMARY OF THE INVENTION

Accordingly, the present invention provides a non-fouling print finger having an integral shield. The print finger has a movable arm with a print stylus at the end, the movable arm situated between the print finger body and an integral shield. The shield funnels the print residue past the print stylus into a reduced area below the print stylus from which the residue is free to fall. The shield also retains the print stylus by bracing the movable arm during cleaning, thereby preventing damage.

Therefore it is an object of the present invention to provide a print stylus which is free from fouling.

Another object of the present invention is to provide a mechanism for retaining the print stylus to prevent damage during cleaning.

Other objects, advantages and novel features of the present invention will be apparent from the following detailed description when read in view of the appended claims and attached drawing.

BRIEF DESCRIPTION OF THE DRAWING

FIG. 1 is a plan view of a prior art print finger.

FIG. 2 is a plan view of a print stylus having an integral shield according to the present invention.

DESCRIPTION OF THE PREFERRED EMBODIMENT

Referring now to FIG. 2 a print finger 10 has a basically circular outer circumference. A movable arm 12 integral with the print finger 10 terminates in a print stylus 14 which protrudes beyond the circumference of the print finger. A shield 16, integral with the print finger 10 and forming part of the circumference, is situated before the movable arm 14 such that the movable arm is between the shield and the print finger body 18. A portion 20 of the print body 18 is cut away, or reduced, in the area behind the movable arm 12.

In operation the electrosensitive paper 22 moves past the print finger 10 as indicated by the arrow 24. Print residue 26 from the paper 22 is deflected by the shield 16 past the print stylus 14 into the cutaway portion 20 of the print finger body 18, from whence the residue is free to fall from the print finger 10 without fouling the print stylus. The shield 16 provides a stationary surface along the path of the paper 22.

During cleaning of the print stylus 14 the brushing against the paper direction 24 forces the movable arm 12 up against the shield 16. The shield 16 thus restrains the movable arm 12 from exceeding its yield point, thereby preventing damage.

Thus, it is readily apparent that the present invention provides a novel print finger with a unique integral shield which prevents fouling of the print stylus while also restraining excess bending of the movable arm during cleaning.

What is claimed is:

1. A non-fouling print finger comprising:
   (a) a body;
   (b) a movable arm integral with said body, said movable arm terminating in a print stylus which extends beyond the perimeter of said body; and
   (c) a shield integral with said body and forming part of the perimeter of said body, said shield being situated such that said movable arm is between said shield and said body.

2. A non-fouling print finger as recited in claim 1 wherein said body has an approximately circular perimeter with a reduced area situated behind said movable arm to allow residue to fall from said print finger.

* * * * *